(12) United States Patent
Omori

(10) Patent No.: US 11,454,276 B2
(45) Date of Patent: Sep. 27, 2022

(54) THRUST FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/272,697

(22) PCT Filed: Sep. 3, 2019

(86) PCT No.: PCT/JP2019/034533
§ 371 (c)(1),
(2) Date: Mar. 2, 2021

(87) PCT Pub. No.: WO2020/050240
PCT Pub. Date: Mar. 12, 2020

(65) Prior Publication Data
US 2021/0355990 A1     Nov. 18, 2021

(30) Foreign Application Priority Data
Sep. 4, 2018   (JP) .............................. JP2018-165317

(51) Int. Cl.
*F16C 17/04* (2006.01)
(52) U.S. Cl.
CPC .................................. *F16C 17/042* (2013.01)
(58) Field of Classification Search
CPC ...................................................... F16C 17/042
See application file for complete search history.

(56) References Cited

U.S. PATENT DOCUMENTS

| | | | |
|---|---|---|---|
| 4,247,155 A | 1/1981 | Fortmann | |
| 4,701,060 A | 10/1987 | Gu | |
| 5,529,398 A | 6/1996 | Bosley | |
| 9,062,712 B1 * | 6/2015 | Bruckner | .............. F16C 37/002 |
| 2014/0169707 A1 | 6/2014 | Yoshino | |
| 2015/0219147 A1 | 8/2015 | Furuno | |
| 2015/0330443 A1 | 11/2015 | Omori | |
| 2016/0195129 A1 | 7/2016 | Omori | |
| 2016/0356310 A1 | 12/2016 | Yoshino et al. | |

FOREIGN PATENT DOCUMENTS

| | | |
|---|---|---|
| CN | 105518323 A | 4/2016 |
| JP | S62-134923 U | 8/1987 |
| JP | H10-511446 A | 11/1998 |
| JP | 2013-047555 A | 3/2013 |
| JP | 2013-053645 A | 3/2013 |
| JP | 2015-132309 A | 7/2015 |
| JP | 2017-180685 A | 10/2017 |
| JP | 2018-040413 A | 3/2018 |
| JP | 2018-040414 A | 3/2018 |
| WO | 2013/018605 A1 | 2/2013 |
| WO | 2014/061698 A1 | 4/2014 |

* cited by examiner

Primary Examiner — James Pilkington

(57) ABSTRACT

A thrust foil bearing of the present disclosure includes a base plate which includes an insertion hole through which a rotation shaft is inserted, a back foil which is disposed around the insertion hole and supported by the base plate, and a top foil which is supported by the back foil, wherein the top foil includes an expansion portion in which a width of the expansion portion in a virtual straight line direction in which a virtual straight line extends decreases in a direction orthogonal to the virtual straight line, the virtual straight line being supported by the back foil on a most downstream side in a rotation direction of the shaft.

7 Claims, 9 Drawing Sheets

THRUST FOIL BEARING

CROSS-REFERENCE TO RELATED APPLICATIONS

Priority is claimed on Japanese Patent Application No. 2018-165317, filed Sep. 4, 2018, the content of which is incorporated herein by reference.

TECHNICAL FIELD

The present disclosure relates to a thrust foil bearing.

BACKGROUND ART

Conventionally, a thrust foil bearing disposed to face a thrust collar provided on a rotation shaft is known as a bearing for a high-speed rotating body. The thrust foil bearing is made of a foil (a thin metal plate) with a flexible bearing surface to absorb movement of a rotation shaft (an axial displacement and a tilt of the thrust collar) caused by vibration or an impact, and has a foil structure for flexibly supporting the bearing surface below the bearing surface.

The thrust foil bearing has an aspect in which a plurality of top foil pieces and back foil pieces are arranged in a circumferential direction. The top foil pieces are supported by the back foil pieces, and air is introduced between the top foil pieces and the thrust collar due to rotation of the thrust collar. This air forms a wedge-shaped fluid lubricating film between the top foil piece and the thrust collar, and the thrust foil bearing exhibits a load capacity.

RELATED ART DOCUMENTS

Patent Documents

[Patent Document 1]
PCT International Publication No. WO2014/061698

SUMMARY

Technical Problem

Incidentally, in the above thrust foil bearing, when a pressure of the fluid lubricating film acts on the top foil, the pressure becomes the highest on the downstream end side of the top foil. Therefore, bending (flexure) in a radial direction becomes large on the downstream end side of the top foil. That is, on the downstream end side of the top foil, a radially outer portion is closer to the base plate than a radially inner portion is, and a distance from the opposite thrust collar is widened. Thus, further increase in the pressure of the fluid lubricating film becomes difficult at the portion, and the load capacity as a bearing decreases.

When the top foil is thickened, the bending can be reduced. However, when the top foil becomes thicker, a tilt deformation in the circumferential direction will be hindered. When the tilt deformation in the circumferential direction is hindered, it becomes difficult to form an appropriate taper angle, and the bearing load capacity decreases. As described above, the top foil is required to have rigidity (anisotropic rigidity) which is strong in response to the bending in the radial direction and flexible in the circumferential direction.

The present disclosure has been made in view of the above problems, and an object thereof is to suppress radial bending of a top foil on the downstream end side of the top foil.

Solution to Problem

According to one aspect of the present disclosure, there is provided a thrust foil bearing including a base plate which includes an insertion hole through which a shaft is inserted, a back foil which is disposed around the insertion hole and supported by the base plate, and a top foil which is supported by the back foil, wherein the top foil includes an expansion portion in which a width of the expansion portion in a virtual straight line direction in which a virtual straight line extends decreases in a direction orthogonal to the virtual straight line, the virtual straight line being supported by the back foil on a most downstream side in a rotation direction of the shaft.

Also, in the aspect of the present disclosure, the expansion portion may include a single peak on a downstream side in the rotation direction, and the width of the expansion portion in the virtual straight line direction may decrease toward the peak.

Also, in the aspect of the present disclosure, the width of the expansion portion in the virtual straight line direction may monotonically decrease toward the peak.

Also, in the aspect of the present disclosure, the peak may be provided on an outer peripheral side of the top foil.

Also, in the aspect of the present disclosure, the expansion portion may be provided with a through-hole.

Effect of the Invention

According to the present disclosure, it is possible to suppress radial bending of a top foil on the downstream end side of the top foil.

DETAILED DESCRIPTION

Hereinafter, a thrust foil bearing of the present disclosure will be described in detail with reference to the drawings.

Figure 1:
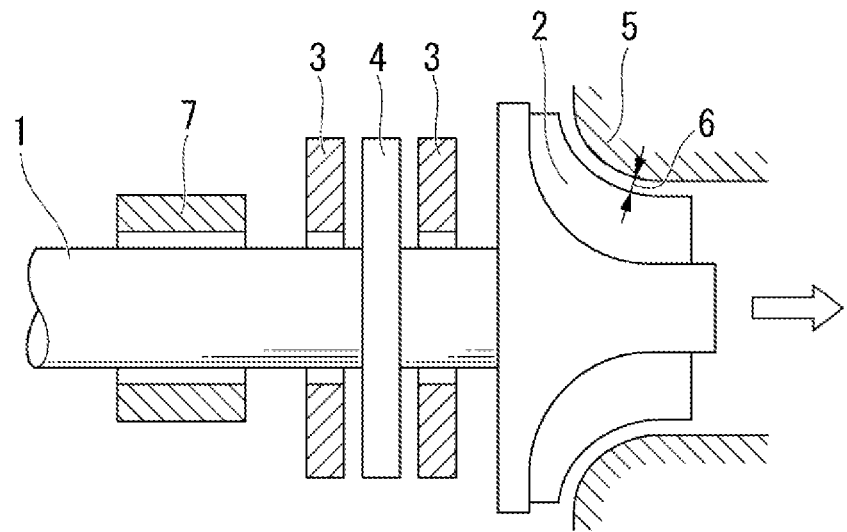
FIG. 1 is a side view showing an example of a turbomachine to which a thrust foil bearing 3 of the present disclosure is applied.

FIG. 1 is a side view showing an example of a turbomachine to which the thrust foil bearing of the present disclosure is applied.

In FIG. 1, a reference numeral 1 is a rotation shaft (a shaft), a reference numeral 2 is an impeller provided at a tip end portion of the rotation shaft, and a reference numeral 3 is a thrust foil bearing according to the present disclosure. A disk-shaped thrust collar 4 is fixed to the rotation shaft 1. The thrust collar 4 is sandwiched between a pair of thrust foil bearings 3. The impeller 2 is disposed in a housing 5 on the stationary side, and has a tip clearance 6 between the impeller 2 and the housing 5. The rotation shaft 1 is supported by a radial foil bearing 7.

Figure 2:
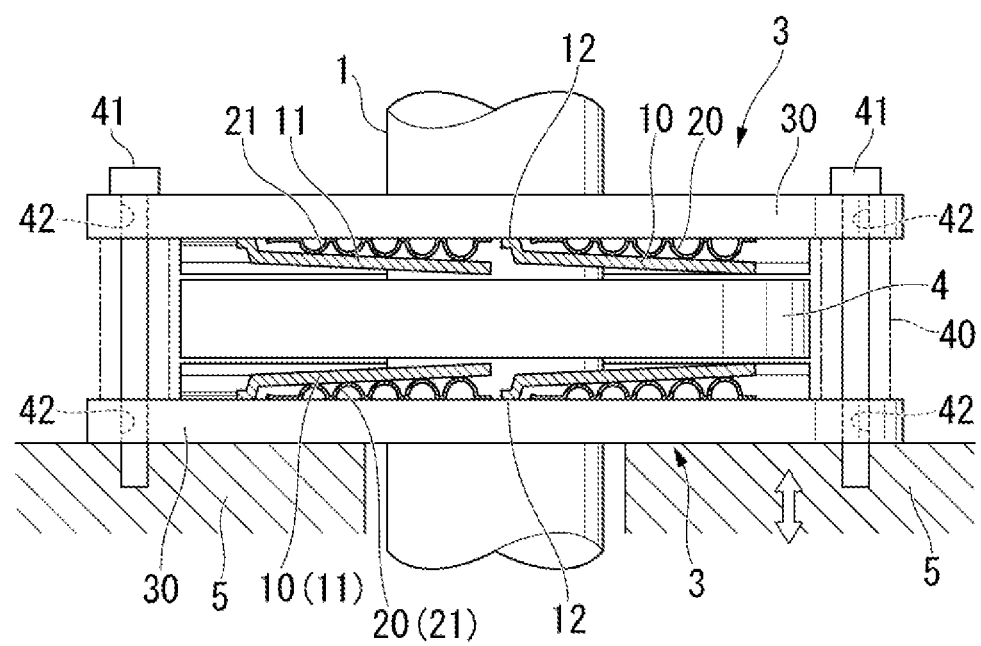
FIG. 2 is a side view showing the thrust foil bearing 3 of the present disclosure.
Figure 3:
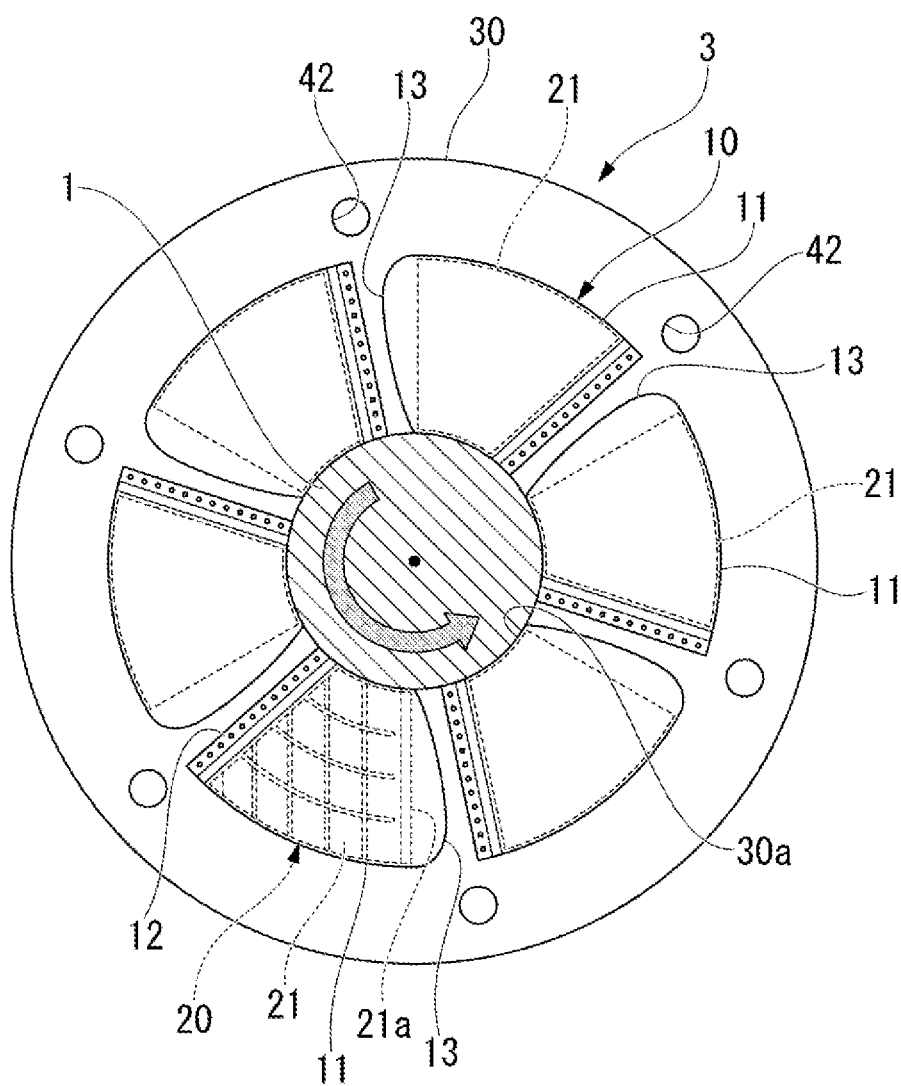
FIG. 3 is a plan view showing the thrust foil bearing 3 of the present disclosure.
Figure 4A:
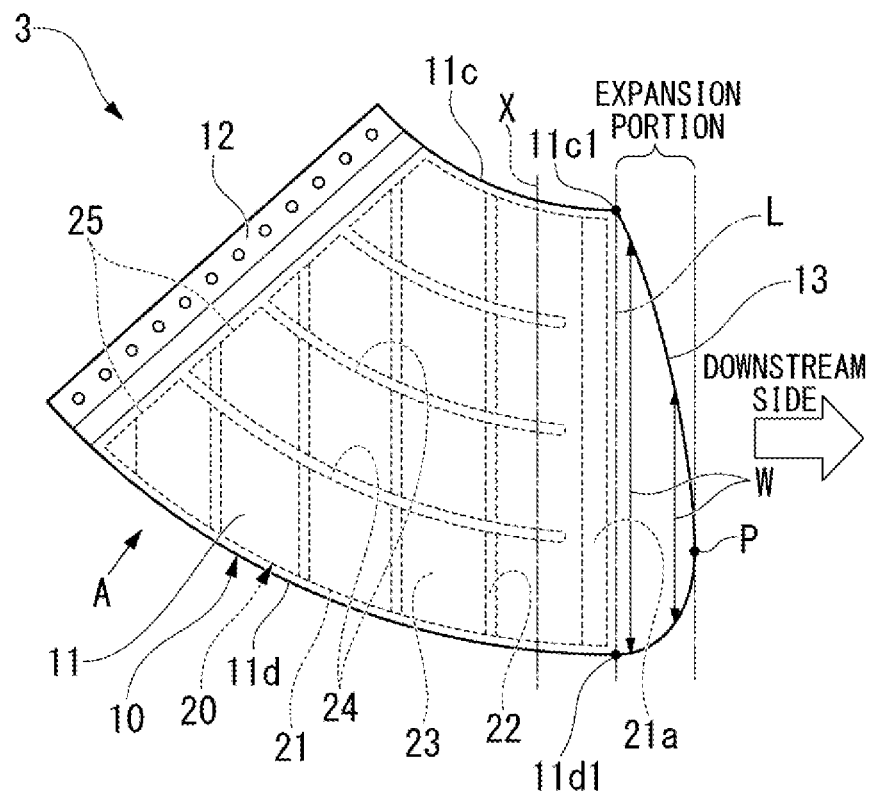
FIG. 4A is a configuration diagram showing a back foil piece 21 and a top foil piece 11 of the present disclosure.
Figure 4B:
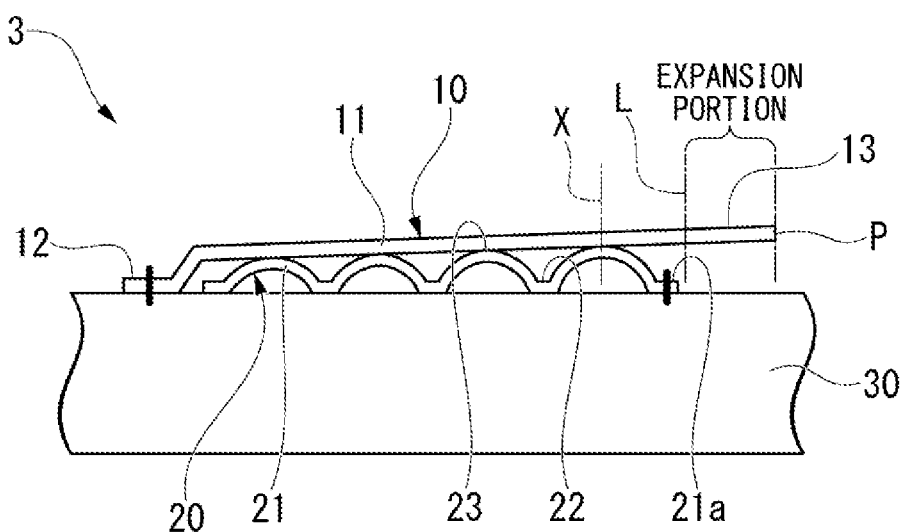
FIG. 4B is a configuration diagram showing the back foil piece 21 and the top foil piece 11 of the present disclosure.

FIG. 2 is a side view showing the thrust foil bearing 3 of the present disclosure. FIG. 3 is a plan view showing the thrust foil bearing 3 of the present disclosure. FIGS. 4A and 4B are configuration diagrams showing a back foil piece 21 (a bump foil piece 21) and a top foil piece 11 of the present disclosure. FIG. 4A shows a plan view, and FIG. 4B shows a view of an arrow A in FIG. 4A (a view seen from A in the drawing in a direction of an arrow). That is, FIG. 4B is a view of the back foil piece 21 and the top foil piece 11 when seen from the outside in a radial direction.

As shown in FIG. 2, a pair of thrust foil bearings 3 is provided on both sides of the thrust collar 4 with the thrust collar 4 interposed therebetween. Both of the pair of thrust foil bearings 3 have the same configuration. The thrust foil bearing 3 includes a top foil 10, a back foil 20, and a base plate 30. As shown in FIG. 3, the base plate 30 includes an insertion hole 30a through which the rotation shaft 1 is inserted.

In the following description, a positional relationship of each of members may be described with reference to the insertion hole 30a. Specifically, an "axial direction" refers to a direction in which the insertion hole 30a extends (a direction in which the rotation shaft 1 is inserted). Further, a "radial direction" refers to a radial direction of the insertion hole 30a. A "circumferential direction" refers to a circumferential direction along an inner peripheral surface of the insertion hole 30a. Alternatively, they can be said to be a "radial direction" and a "circumferential direction" as seen from an axis of the rotation shaft 1 inserted through the insertion hole 30a.

The base plate 30 is a disk-shaped member which constitutes an outermost portion (the side opposite to the thrust collar) of the thrust foil bearing 3 in the axial direction. The insertion hole 30a is formed in the base plate 30. That is, the base plate 30 of the present disclosure is an annular member. The base plate 30 includes a flat surface which is disposed to face the thrust collar 4. The back foil 20 and the top foil 10 are disposed around the insertion hole 30a (an opening) on the flat surface of the base plate 30. Specifically, the back foil 20 is supported by the base plate 30, and the top foil 10 is supported by the back foil 20. The base plate 30 of the present disclosure is a disk-shaped member having the insertion hole 30a. However, when the insertion hole 30a is provided, the base plate 30 may be a member other than the disk-shaped member (for example, a member having a rectangular plate shape). Further, the insertion hole 30a does not necessarily have to have a strict cylindrical shape.

As shown in FIG. 2, a cylindrical bearing spacer 40 indicated by a two dots dashed line is sandwiched between the base plates 30 of the pair of thrust foil bearings 3. Then, the base plates 30 are connected by fastening bolts 41 with the bearing spacer 40 interposed therebetween. One of the base plates 30 is fixed to the housing 5 by the fastening bolts 41.

The base plate 30 is formed of, for example, a metal plate having a thickness of about several mm. As shown in FIG. 3, a plurality of through-holes 42 for inserting the fastening bolts 41 are formed in an outer peripheral portion of the base plate 30. The base plate 30 supports the back foil 20 and the top foil 10 on a surface thereof facing the thrust collar 4. In the present disclosure, as will be described later, the back foil 20 and the top foil 10 are respectively formed by a plurality of (six pieces of) back foil pieces 21 and a plurality of (six pieces of) top foil pieces 11. The base plate 30 of the present disclosure supports the back foil piece 21 and the top foil piece 11 in each of six regions of the surface of the base plate 30 facing the thrust collar 4, the six regions being provided at equal intervals in the circumferential direction.

As shown in FIG. 3, the back foil 20 is formed by six back foil pieces 21 arranged in the circumferential direction. In the present disclosure, the back foil pieces 21 are formed to be smaller than the top foil pieces 11 described later in a plan view shown in FIG. 3. Therefore, the back foil pieces 21 are covered with the top foil pieces 11 on the base plate 30 as shown in FIG. 3 when seen in the axial direction. Further, in the present disclosure, the top foil pieces 11 are spaced apart from each other in the circumferential direction. Further, a distance between the top foil pieces 11 adjacent to each other in the circumferential direction becomes wider from the inner peripheral side toward the outer peripheral side.

The back foil pieces 21 are corrugated foils (thin plates). The back foil pieces 21 elastically support the top foil pieces 11. For example, a bump foil, a spring foil described in Japanese Unexamined Patent Application, First Publication No. 2006-57652 or Japanese Unexamined Patent Application, First Publication No. 2004-270904, a back foil described in Japanese Unexamined Patent Application, First Publication No. 2009-299748 and the like are used as such a back foil 20. Although the spring foil described in Japanese Unexamined Patent Application, First Publication No. 2006-57652 or Japanese Unexamined Patent Application, First Publication No. 2004-270904, and the back foil described in Japanese Unexamined Patent Application, First Publication No. 2009-299748 are foils used for a radial bearing, when these are expanded into a flat shape and formed in an annular plate shape, the foil used for the thrust foil bearing 3 can be obtained.

The back foil 20 of the present disclosure is formed of a bump foil as shown in FIG. 2. As shown in FIG. 3, the back foil piece 21 is formed in a substantially trapezoidal shape in which the apex side of sector as a whole is cut out and each of the inner peripheral side and the outer peripheral side has an arc shape. That is, the back foil piece 21 includes two edges which are spaced apart from each other in the circumferential direction and extend from the inner peripheral side to the outer peripheral side, an inner peripheral edge which connects the two edges on the inner peripheral side, and an outer peripheral edge which connects the two edges on the outer peripheral side. The back foil piece 21 of the present disclosure includes a first side end which is an edge of one side in the circumferential direction, a second side end which is an edge of the other side in the circumferential direction, an arc-shaped outer peripheral end which connects outer peripheral end portions of the first and second side ends, and an arc-shaped inner peripheral end which connects inner peripheral end portions of the first and second side ends. Here, the thrust collar 4 is rotating to the other side in the circumferential direction.

The first side end of the back foil piece 21 is formed of a plurality of edges separated from the inner peripheral side to the outer peripheral side. That is, a plurality of slits 24 which extend from the first side end to the second side end are formed in the back foil piece 21. As shown in FIG. 4B, the back foil piece 21 is formed by alternately disposing valley portions 22 and mountain portions 23. That is, the valley portions 22 and the mountain portions 23 are continuous from one side in the circumferential direction to the other side in the circumferential direction at each of portions separated by the slits 24 of the back foil piece 21. The valley portions 22 and the mountain portions 23 extend linearly through the slit 24. The valley portion 22 of the present disclosure includes a flat surface and faces the base plate 30. Further, the mountain portion 23 is an arch-shaped portion which connects the adjacent valley portions 22. The back foil piece 21 is supported by the base plate 30. Therefore, the valley portion 22 can come into contact with the base plate 30.

In the back foil piece 21 of the present disclosure, the valley portion 22 extends to either the inner peripheral end or the outer peripheral end. A position of the back foil piece 21 on the other side in the circumferential direction is spot welded (dot welded) to the base plate 30. That is, this welding position is a mounting position of the back foil piece 21 with respect to the base plate 30. Further, the mounting position of the back foil piece 21 is the valley portion 22. In the present disclosure, the mounting position of the back foil piece 21 is the valley portion 22 located on the most other side in the circumferential direction. Further, one side of the back foil piece 21 in the circumferential direction is a free end. That is, when a load acts on the back foil piece 21, the edge on one side in the circumferential direction can move toward one side in the circumferential direction. The back foil piece 21 can be mounted on the base plate 30 by, for example, screwing, instead of spot welding.

The valley portions 22 and the mountain portions 23 are alternately arranged in a direction orthogonal to (a direction intersecting with) an end side 21a (a fixed end) of the back foil piece 21 on the other side in the circumferential direction. That is, the valley portions 22 and the mountain portions 23 extend parallel to the fixed end. The valley portions 22 and the mountain portions 23 are formed at substantially equal pitches. Further, as shown in FIG. 4B, a height of the mountain portion 23 is formed to increase in order from the side opposite to the end side 21a toward the end side 21a, that is, toward the downstream side in a rotation direction (toward the other side from one side in the circumferential direction) of the rotation shaft 1 (the thrust collar 4) indicated by an arrow in FIG. 3.

Thus, the top foil piece 11 supported by the back foil piece 21 is disposed to be inclined at an initial inclination angle to gradually become further away from the base plate 30 as it goes from the fixed side 12 side toward the end side 21a side of the back foil piece 21 in an arrangement direction of the valley portions 22 and the mountain portions 23. Here, the initial inclination angle is an inclination angle of the top foil piece 11 with respect to the base plate 30 when the load is zero.

As shown in FIG. 4A, in the back foil piece 21, one side in the circumferential direction (the upstream side in the rotation direction) is divided into a plurality of (four in the present disclosure) end sides 25 in the radial direction. Each of the four end sides 25 is formed to be displaceable in the circumferential direction. The slit 24 is formed between the four end sides 25. The slit 24 of the present disclosure is formed in an arc shape which forms a part of a concentric circle with the insertion hole 30a. Further, the slit 24 of the present disclosure extends to the mountain portion 23 adjacent to the mounting position of the back foil piece 21 with respect to the base plate 30.

That is, the slit 24 extends to a position between the mounting position of the back foil piece 21 and the valley portion 22 adjacent to one side of the mounting position in the circumferential direction.

As shown in FIG. 3, the top foil 10 is also formed of six top foil pieces 11 arranged in the circumferential direction. Each of the top foil pieces 11 is formed of a thin metal plate (a foil) in a substantially trapezoidal shape in which the apex side of a sector is cut out and each of the inner peripheral side and the outer peripheral side has an arc shape. That is, the top foil piece 11 includes two edges which are spaced apart from each other in the circumferential direction and extend from the inner peripheral side to the outer peripheral side, an inner peripheral edge which connects the two edges on the inner peripheral side, and an outer peripheral edge which connects the two edges on the outer peripheral side. The top foil piece 11 of the present disclosure includes a first side end which is an edge on one side in the circumferential direction, a second side end which is an edge on the other side in the circumferential direction, an arc-shaped outer peripheral end which connects outer peripheral end portions of the first and second side ends, and an arc-shaped inner peripheral end which connects the inner peripheral end portions of the first and second side ends. The top foil piece 11 includes an expansion portion 13 on the other side in the circumferential direction (the downstream side in the rotation direction). The expansion portion 13 is a portion of the top foil piece 11 which does not overlap the back foil piece 21 in the axial direction. In the back foil piece 21 of the present disclosure, a linear region on the other side in the circumferential direction is formed of the valley portion 22, and the valley portion 22 is the end side 21a spot-welded to the base plate 30. Further, the mountain portion 23 is located on one side of the spot-welded valley portion 22 (the end side 21a) in the circumferential direction and supports the top foil piece 11. Therefore, it can be said that the expansion portion 13 is a region of the top foil piece 11 which is not supported by the back foil piece 21. The top foil piece 11 having such a shape covers the back foil piece 21 on the base plate 30 and is disposed in a substantially annular plate shape as a whole to form the top foil 10.

A position of the top foil piece 11 on one side in the circumferential direction is spot welded (dot welded) to the base plate 30. In the present disclosure, a plurality of points on the same straight line are spot-welded, and are spot-welded to the base plate 30 on a straight line which extends from an axis of the insertion hole 30a in the radial direction. That is, this welding position is a mounting position (the fixed side 12) of the top foil piece 11 with respect to the base plate 30. Further, the mounting position of the top foil piece 11 is disposed to be spaced apart from the back foil piece 21 toward one side in the circumferential direction. Further, the other side of the top foil piece 11 in the circumferential direction is a free end. That is, when a load acts on the top foil piece 11, the edge on the other side in the circumferential direction can move toward the other side in the circumferential direction. The top foil piece 11 can be mounted on the base plate 30 by, for example, screwing, instead of spot welding.

As shown in FIG. 4B, in the top foil piece 11, a portion on the fixed side 12 side is bent, and a portion of which a height gradually increases toward the other side in the circumferential direction along the arrangement of the mountain portions 23 formed on the back foil piece 21 is provided on the other side in the circumferential direction from the bent portion on the fixed side 12 side. The bent portion on the fixed side 12 side according to the present disclosure is configured of a first bend and a second bend located on the other side of the first bend in the circumferential direction. The first bend is bent to the back surface side of a surface of the top foil piece 11, the surface facing the base plate 30. The second bend is bent to the surface side of the top foil piece 11 which faces the base plate 30. That is, the bent portion on the fixed side 12 side has a stepped shape. Both the first bend and the second bend are formed to have obtuse angles. The other side in the circumferential direction (the expansion portion 13 side) from the fixed side 12 is placed on the mountain portions 23. On the other hand, the expansion portion 13 (trailing edge) is a free end without being fixed. The expansion portion 13 is a portion which extends further to the free end side (the other side in the circumferential direction) of the top foil piece 11 than the mountain portion 23 supporting the top foil piece 11 on the most fixed end (the end side 21a) side of the back foil piece 21. Further, in the present disclosure, the expansion portion 13 extends further to the free end side of the top foil piece 11 than the valley portion 22 (the end side 21a) on the other side in the circumferential direction of the mountain portion 23 which supports the top foil piece 11 on the most fixed end (the end side 21a) side of the back foil piece 21.

As shown in FIG. 4A, the top foil piece 11 includes an end side 11c on the inner peripheral and an end side 11d on the outer peripheral. The end side 11c on the inner peripheral side of the present disclosure is formed to have an arc shape which forms a part of a concentric circle with the insertion hole 30a. Further, the end side 11d on the outer peripheral side is formed to have an arc shape which forms a part of a concentric circle (a concentric circle having a diameter larger than that of the concentric circle formed by the end side 11c) with the insertion hole 30a.

The expansion portion 13 expands to the downstream side in the rotation direction of the rotation shaft 1 with respect to a virtual side end L which connects a downstream end 11c1 of the end side 11c on the inner peripheral side to a downstream end 11d1 of the end side 11d on the outer peripheral side.

Here, the downstream end 11c1 of the end side 11c on the inner peripheral side means an inflection point of which, on the other side of the end side 11c in the circumferential direction, a curvature changes by being connected to the inner peripheral end of the edge on the other side of the top foil piece 11 in the circumferential direction. Further, the downstream end 11d1 of the end side 11d on the outer peripheral side means an inflection point of which, on the other side of the end side 11d in the circumferential direction, a curvature changes by being connected to the outer peripheral end of the edge on the other side of the top foil piece 11 in the circumferential direction.

In the expansion portion 13, a width W of the expansion portion 13 in a virtual straight line direction in which a virtual straight line X extends decreases in a direction orthogonal to the virtual straight line X (a direction indicated by a white arrow shown in FIG. 4A) supported by the mountain portion 23 located on the most other side of the back foil piece 21 in the circumferential direction. Here, the virtual straight line X is a tangent line in which the back foil piece 21 is in contact with the top foil piece 11 on the most downstream side in the rotation direction of the rotation shaft 1 (a straight line which connects contact points in contact with the top foil 10 on the most downstream side when the back foil 20 is a foaming type). As the expansion portion 13 of the present disclosure goes toward the downstream side in the direction orthogonal to the virtual straight line X, the width W in the virtual straight line direction decreases monotonically, but the width W does not necessarily have to decrease monotonically. The expansion portion 13 includes a single peak P on the downstream side in the rotation direction of the rotation shaft 1, and has a shape in which the width W in the virtual straight line direction monotonically decreases toward the peak P. That is, when seen in the circumferential direction, a distance between the edge of the top foil piece 11 of the present disclosure on the other side in the circumferential direction and the mountain portion 23 located on the most other side of the back foil piece 21 in the circumferential direction varies in the radial direction. The distance when seen in the circumferential direction is maximum at the peak P. Further, an angle of the expansion portion 13 is maximum at a position different from the peak P on the downstream side in the rotation direction in a plan view. In the example shown in FIG. 4A, the angle is maximum at the position located on the outer peripheral side than a middle position in the radial direction between the inner peripheral end and the outer peripheral end of the edge on the other side of the top foil piece 11 in the circumferential direction. The peak P may be not only an apex but also a side (linear peak) having a certain width. That is, the peak P of the expansion portion 13 is a portion located on the most downstream side in the rotation direction of the rotation shaft 1, and the width W on the free end side of the top foil piece 11 which is an apex or a side decreases as it goes toward the free end in the virtual straight line direction.

As shown in FIG. 4A, the peak P of the expansion portion 13 is provided on the outer peripheral side of the top foil piece 11. Here, the outer peripheral side of the top foil piece 11 is the outermost region in the radial direction when the top foil piece 11 is divided into three portions in the radial direction. As shown in FIG. 4B, the expansion portion 13 extends further to the downstream side in the rotational direction than the end side 21a of the back foil piece 21 and is not supported by the mountain portion 23 of the back foil piece 21. Further, the expansion portion 13 has the same thickness as that of the portion of the top foil piece 11 other than the expansion portion 13.

Next, an operation of the thrust foil bearing 3 having such a configuration will be described.

As shown in FIG. 2, the thrust foil bearings 3 are provided on both sides of the thrust collar 4 with the thrust collar 4 interposed therebetween. Therefore, movement of the thrust collar 4 toward both sides in a thrust direction of the rotation shaft 1 can be suppressed.

When the rotation shaft 1 rotates in such a state and the thrust collar 4 starts rotation, the surrounding fluid is pushed into the wedge-shaped space formed between the thrust collar 4 and the top foil piece 11 while the thrust collar 4 and the top foil piece 11 rub each other. Then, when the thrust collar 4 reaches a predetermined rotation speed, a fluid lubricating film is formed between the thrust collar 4 and the top foil piece 11. Due to a pressure of the fluid lubricating film, the top foil piece 11 (the top foil 10) is pressed toward the back foil piece 21 (the back foil 20), and the thrust collar 4 comes to be out of contact with the top foil piece 11 and rotates in a non-contact manner.

At this time, the back foil piece 21 is pressed toward the base plate 30, and the inclination angle of the top foil piece 11 becomes shallower (smaller) than the initial inclination angle. Since the upstream side of the back foil piece 21 in the rotation direction of the rotation shaft 1 is divided into four (plurality) in the radial direction, each of the end sides 25 (the divided pieces) can move independently. That is, each of the end sides 25 can have a different amount of deformation. Thus, the back foil piece 21 is smoothly deformed in the circumferential direction.

Figure 5:
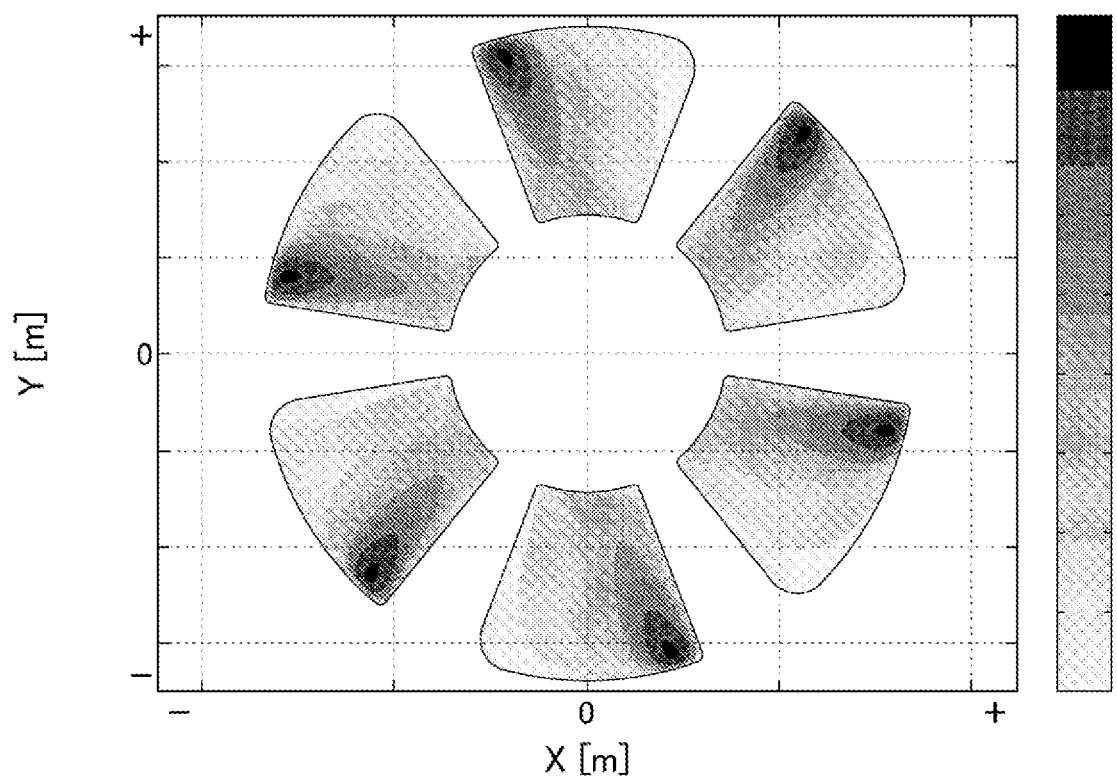
FIG. 5 is an analysis diagram showing a pressure distribution of a fluid lubricating film acting on the top foil piece (without an expansion portion) according to an embodiment.

FIG. 5 is an analysis diagram showing a pressure distribution of the fluid lubricating film acting on the top foil piece (without the expansion portion) according to the embodiment. In FIG. 5, a level of pressure is indicated by shade of dots.

Since the downstream end side of the top foil piece is the narrowest portion of the wedge-shaped space, a high pressure due to the fluid lubricating film acts thereon as shown in FIG. 5. The high pressure due to the fluid lubricating film acts on the outer peripheral side of the top foil piece in FIG. 5, but a position thereof may change in the radial direction according to a support rigidity of the back foil piece. However, since a circumferential speed of the thrust collar is faster on the outer peripheral side of the top foil piece than on the inner peripheral side thereof, the high pressure due to the fluid lubricating film tends to act on the outer peripheral side of the top foil piece.

Figure 6A:
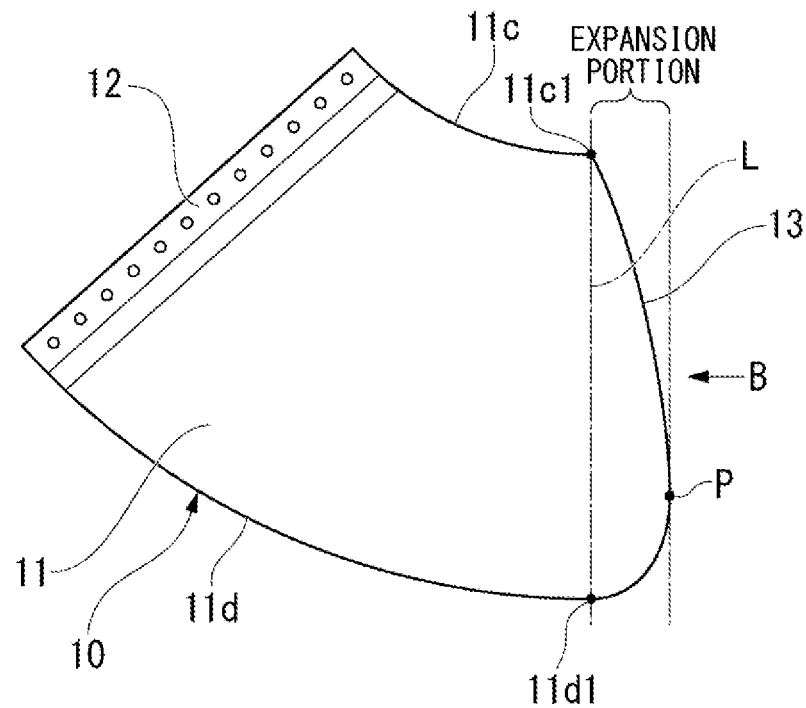
FIG. 6A is a diagram showing an action of the top foil piece 11 having an expansion portion 13 of the present disclosure.
Figure 6B:
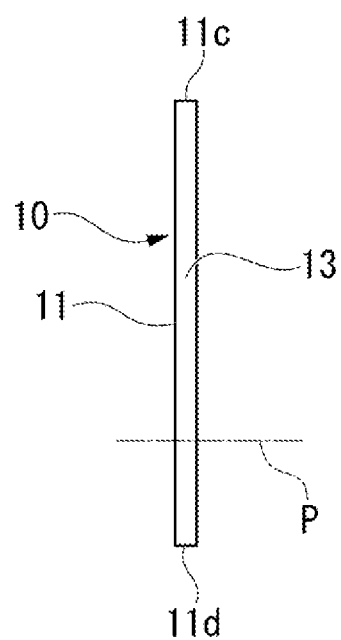
FIG. 6B is a diagram showing the action of the top foil piece 11 having the expansion portion 13 of the present disclosure.

FIGS. 6A and 6B are diagrams illustrating the operation of the top foil piece 11 including the expansion portion 13 of the present disclosure. FIG. 6A shows a plan view, and FIG. 6B shows a view of an arrow B in FIG. 6A (a view seen from position of the letter B in the drawing in a direction of an arrow).

As described above, since the high pressure due to the fluid lubricating film acts on the downstream end side of the top foil piece 11, a force by which the downstream end side of the top foil piece 11 is bent (deflected) in the radial direction is applied thereto. Here, as shown in FIG. 6A, the top foil piece 11 of the present disclosure includes the expansion portion 13 which expands to the downstream side in the rotation direction of the rotation shaft 1 with respect to a virtual side end L connecting the downstream ends 11c1 and 11d1 on the inner and outer periphery of the top foil piece 11. As shown in FIG. 4A, in the expansion portion 13, the width W of the expansion portion 13 in the virtual straight line direction in which the virtual straight line X extends decreases in the direction orthogonal to the virtual straight line X supported by the mountain portion 23 located on the most other side of the back foil piece 21 in the circumferential direction.

With such a configuration, since the downstream end side of the top foil piece 11 is elongated by the expansion portion 13, a rigidity (a second area moment) of the top foil piece 11 against bending in the radial direction can be increased. Therefore, even when a high pressure due to the fluid lubricating film acts on the downstream end side of the top foil piece 11, falling of the downstream end side of the top foil piece 11 to the base plate 30 side is suppressed. Further, in the expansion portion 13, since a lubricating fluid is held on the top foil piece 11 for a long time in the circumferential direction, a high pressure due to the fluid lubricating film is formed over a wide range. Due to these combined actions, a strong fluid lubricating film is formed on the top foil piece 11, and the non-contact state of the top foil 11 with the thrust collar 4 is maintained even at a high load.

Further, in the present disclosure, as shown in FIG. 4A, the expansion portion 13 includes a single peak P on the downstream side in the rotation direction, and the width W of the expansion portion 13 in the virtual straight line direction decreases toward the peak P. With such a configuration, it is not necessary to hold the lubricating fluid for a long time in the circumferential direction at portions in which the pressure due to the fluid lubricating film is relatively smaller than that on the outer peripheral side of the downstream end of the top foil piece 11 in the analysis diagram of FIG. 5 (in the vicinity of the end side on the inner peripheral side of the top foil piece and the end side on the outer peripheral side of the top foil piece). Thus, the lubricating fluid compressed and heated to a high temperature on the top foil piece 11 flows from the downstream ends 11c1 and 11d1 on the inner and outer periphery of the top foil piece 11 to the base plate 30 side to be easily cooled, thus the thrust foil bearing 3 is efficiently cooled, a strong fluid lubricating film is formed, and a bearing load capacity of the thrust foil bearing 3 can be improved.

Further, in the present disclosure, as shown in FIG. 6A, since the peak P of the expansion portion 13 is provided on the outer peripheral side of the top foil piece 11, as shown in FIGS. 5 and 6B described above, it is possible to increase a radial bending rigidity of the top foil piece 11 at a place on which a high pressure due to the fluid lubricating film is likely to act and the radial bending is likely to be maximized. Therefore, bending in the radial direction on the downstream end side of the top foil 10 can be effectively suppressed.

Although one embodiment of the present disclosure has been described above with reference to the drawings, the present disclosure is not limited to the above embodiment. The various shapes and combinations of the constituent members shown in the above-described embodiment are examples and can be variously changed based on design requirements and the like without departing from the scope of the present disclosure.

For example, the thrust foil bearing 3 of the present disclosure may adopt the aspects shown in FIGS. 7A to 10. In the following description, the same or equivalent configurations as those in the above-described embodiment are designated by the same reference numerals, and the description thereof will be simplified or omitted.

Figure 7A:
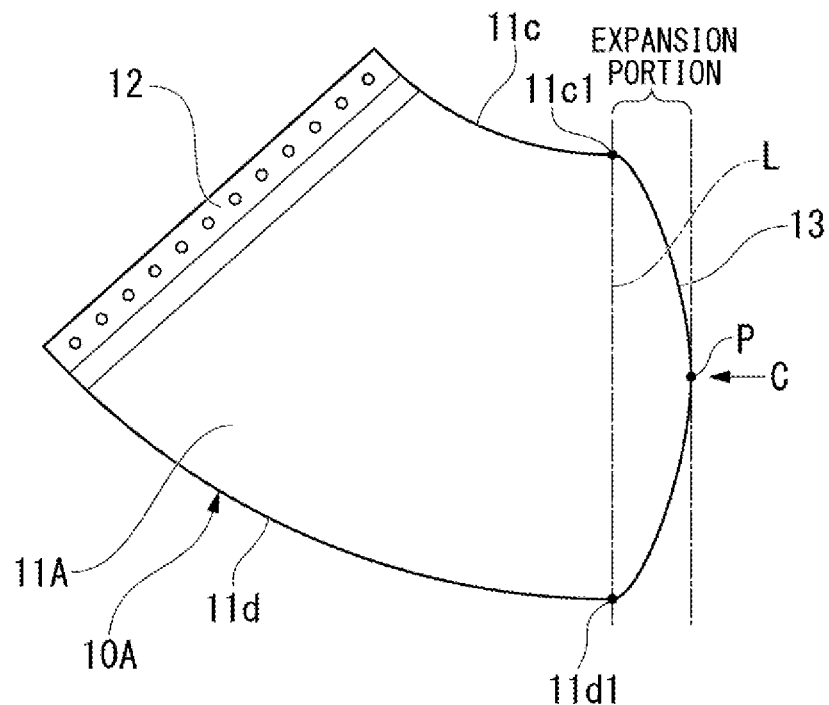
FIG. 7A is a configuration diagram showing a top foil piece 11A according to a modified example of the present disclosure.
Figure 7B:
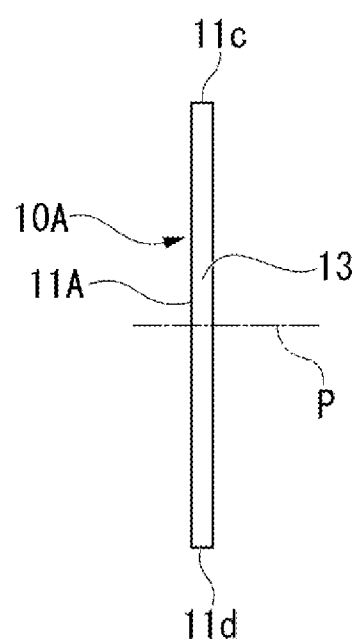
FIG. 7B is a configuration diagram showing the top foil piece 11A according to the modified example of the present disclosure.

FIGS. 7A and 7B are configuration diagrams showing a top foil piece 11A according to a modified example of the present disclosure. FIG. 7A shows a plan view, and FIG. 7B shows a view of an arrow C (a view seen from position of the letter C in the drawing in the direction of the arrow) in FIG. 7A.

As shown in FIG. 7A, the top foil piece 11A (a top foil 10A) includes a peak P of the expansion portion 13 in a middle portion of the top foil piece 11A in the radial direction. Here, the middle portion of the top foil piece 11A in the radial direction is a central region when the top foil piece 11A is divided into three regions in the radial direction. With such a configuration, as shown in FIG. 7B, due to the support rigidity of the back foil piece 21, when the radial bending of the top foil piece 11A on the downstream end side is maximized at the middle portion, the bending can be effectively suppressed.

Figure 8A:
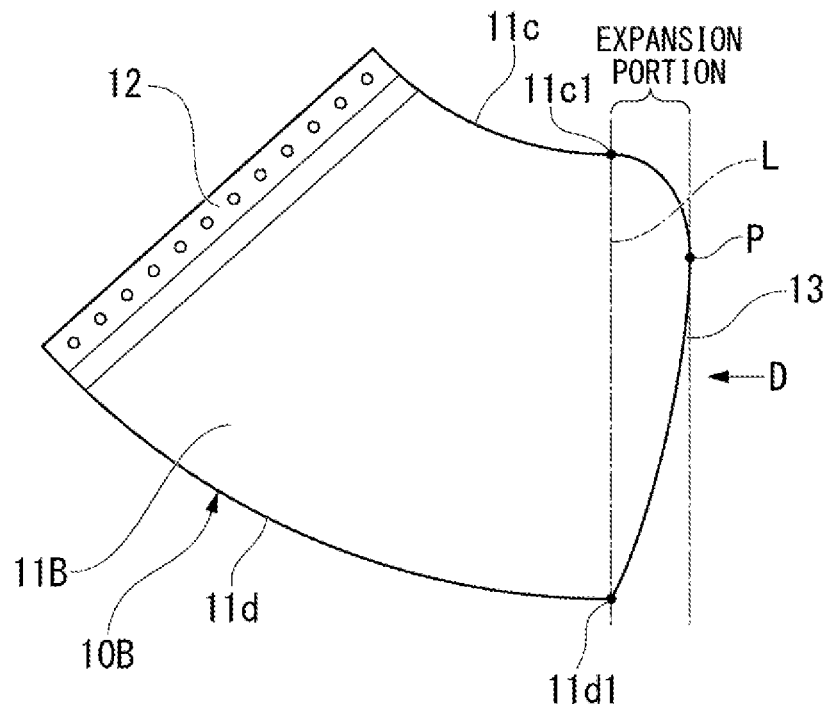
FIG. 8A is a configuration diagram showing a top foil piece 11B according to another modified example of the present disclosure.
Figure 8B:
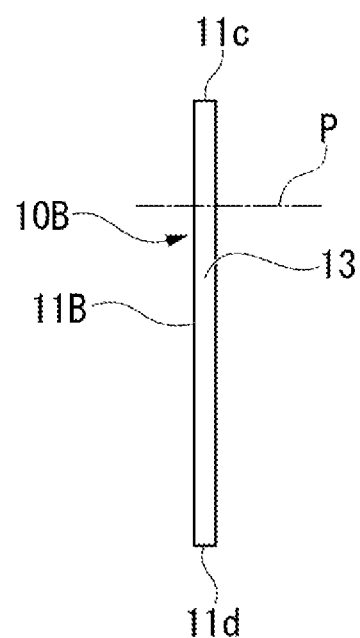
FIG. 8B is a configuration diagram showing the top foil piece 11B according to the other modified example of the present disclosure.

FIGS. 8A and 8B are configuration diagrams showing a top foil piece 11B according to a modified example of the present disclosure. FIG. 8A shows a plan view, and FIG. 8B shows a view of an arrow D (a view seen from the position of the letter D in the drawing in the direction of the arrow) in FIG. 8A.

As shown in FIG. 8A, the top foil piece 11B (a top foil 10B) includes a peak P of the expansion portion 13 on the inner peripheral side of the top foil piece 11B. Here, the inner peripheral side of the top foil piece 11B is the innermost radial region when the top foil piece 11B is divided into three regions in the radial direction. With such a configuration, as shown in FIG. 8B, due to the support rigidity of the back foil piece 21, when the radial bending of the top foil piece 11B on the downstream end side is maximized on the inner peripheral side, the bending can be effectively suppressed.

The degree of freedom in designing the back foil piece 21 is improved by changing the radial position of the peak P of the expansion portion 13 in this way.

Figure 9A:
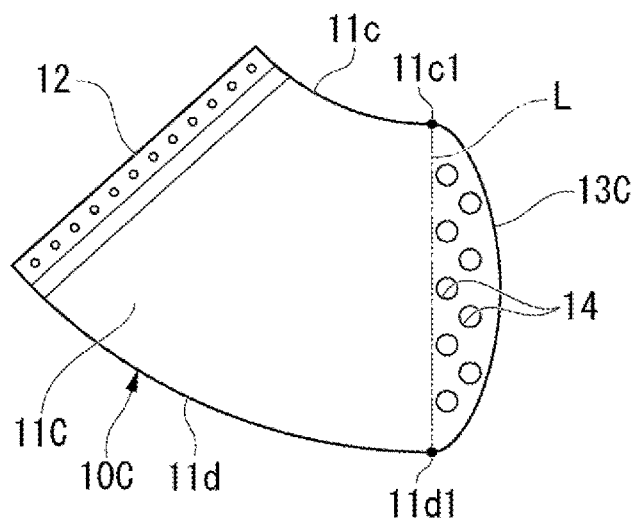
FIG. 9A is a plan view showing a top foil piece 11C according to yet another modified example of the present disclosure.
Figure 9B:
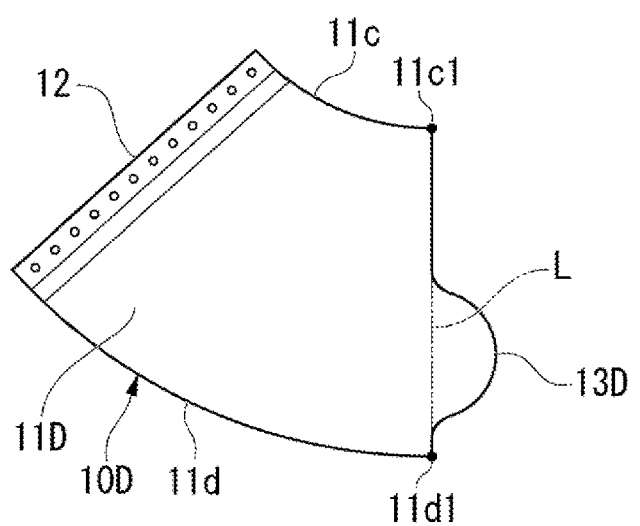
FIG. 9B is a plan view showing a top foil piece 11D according to yet another modified example of the present disclosure.
Figure 9C:
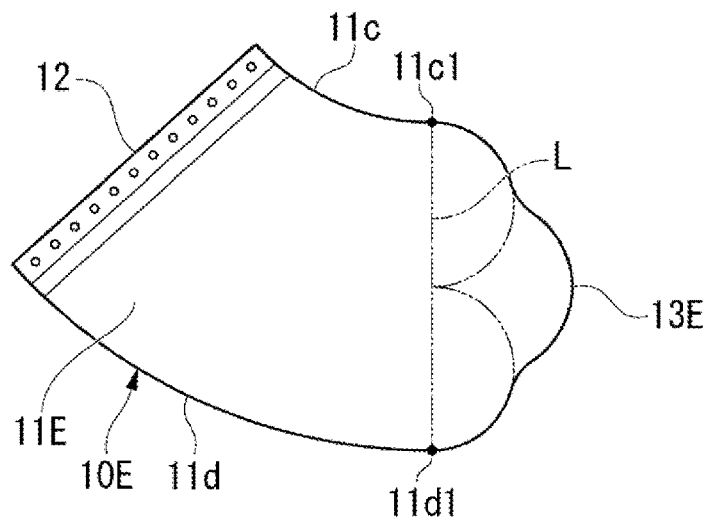
FIG. 9C is a plan view showing a top foil piece 11E according to yet another modified example of the present disclosure.

FIGS. 9A, 9B, and 9C are plan views showing top foil pieces 11C, 11D, and 11E according to a modified example of the present disclosure.

The top foil piece 11C (a top foil 10C) shown in FIG. 9A includes an expansion portion 13C in which a plurality of through-holes 14 are formed. With such a configuration, a lubricating fluid compressed and heated to a high temperature on the top foil piece 11 flows from the through-holes 14 of the expansion portion 13C to the base plate 30 side, and is easily cooled. From the viewpoint of the bending rigidity of the top foil piece 11C, the through-holes 14 are may be arranged, for example, in a zigzag pattern not to be continuous in a direction orthogonal to the radial direction of the top foil piece 11C.

Further, as in the top foil piece 11D (a top foil 10D) shown in FIG. 9B, an expansion portion 13D partially expanding from the downstream end side of the top foil piece 11D may be provided.

Further, like the top foil piece 11E (a top foil 10E) shown in FIG. 9C, an expansion portion 13E expanding from the downstream ends 11c1 and 11d1 of the inner and outer periphery of the top foil piece 11E to have a different shape (for example, a clover shape in a plan view) may be provided.

Figure 10:
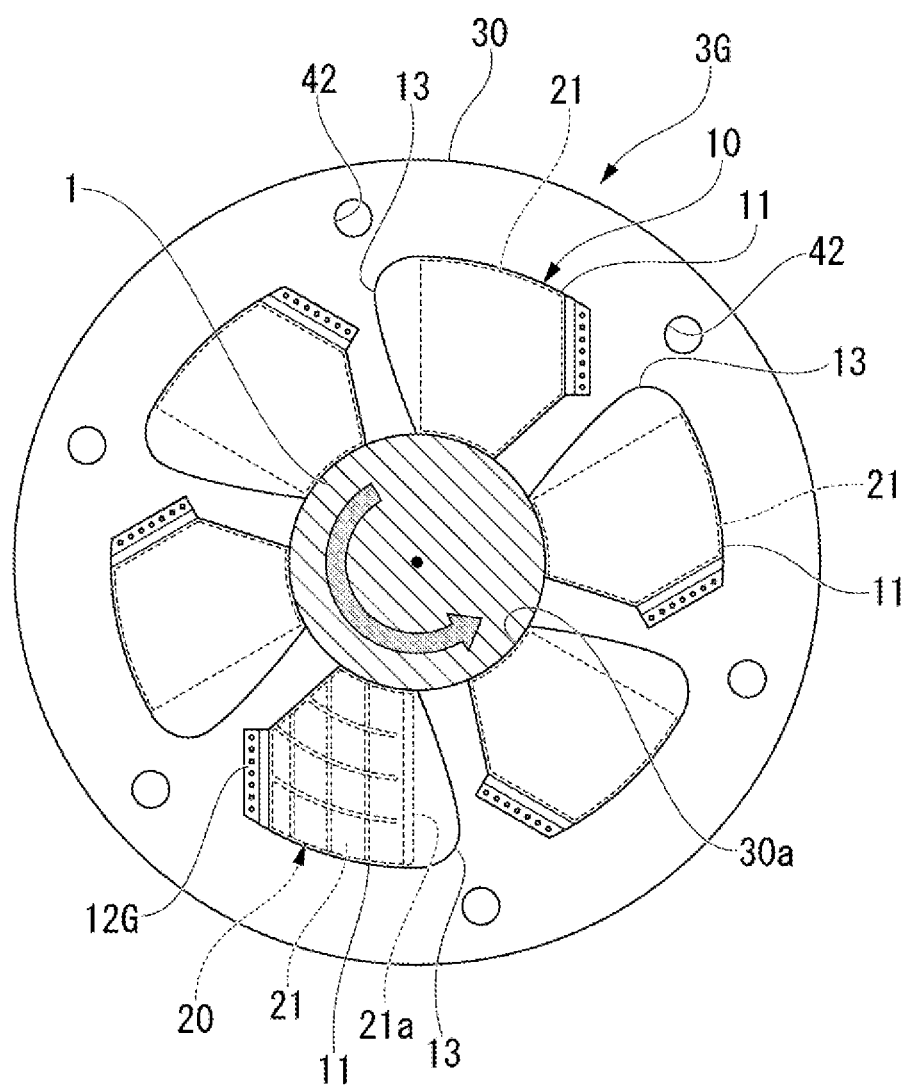
FIG. 10 is a plan view showing a thrust foil bearing 3G according to still another modified example of the present disclosure.

FIG. 10 is a plan view showing a thrust foil bearing 3G according to a modified example of the present disclosure.

As disclosed in Japanese Unexamined Patent Application, First Publication No. 2014-145388, the thrust foil bearing 3G shown in FIG. 10 is formed to be inclined with respect to a straight line extending in the radial direction about the rotation shaft 1 such that a fixed side 12G of the top foil piece 11 approaches the downstream side of the rotation shaft 1 in the rotation direction as the fixed side 12G goes from the inner peripheral side to the outer peripheral side thereof. With such a configuration, since the expansion portion 13 can easily extend to the downstream side in the rotation direction without interfering with (not overlapping) the top foil piece 11 on the downstream side in the rotation direction, the bearing load capacity of the thrust foil bearing 3 can be improved.

Further, for example, in the above-described embodiment, although the top foil 10 has been formed of the plurality of top foil pieces 11 and the back foil 20 has been formed of the plurality of back foil pieces 21, the top foil 10 and the back foil 20 may be formed of single foils which are continuous in the circumferential direction respectively.

INDUSTRIAL APPLICABILITY

It is possible to suppress the radial bending of the top foil on the downstream end side by applying the thrust foil bearing of the present disclosure to the art.

The invention claimed is:

1. A thrust foil bearing comprising:
   a base plate which includes an insertion hole through which a shaft is inserted;
   a back foil which is disposed around the insertion hole and supported by the base plate, the back foil being formed by adjacent mountain portions; and
   a top foil which is supported by the back foil,
   wherein
   the top foil includes an expansion portion in which a width of the expansion portion in a contact line direction in which a contact line extends decreases in a direction orthogonal to the contact line, the contact line being a line in which one mountain portion of the mountain portions of the back foil on a most downstream side in a rotation direction of the shaft is in contact with the top foil,
   the expansion portion includes a single peak on a downstream side in the rotation direction, and
   the top foil is provided with no other expansion portions including peaks on the downstream side in the rotation direction.

2. The thrust foil bearing according to claim 1, wherein the width of the expansion portion in the contact line direction decreases toward the single peak.

3. The thrust foil bearing according to claim 1, wherein the width of the expansion portion in the contact line direction monotonically decreases toward the single peak.

4. The thrust foil bearing according to claim 1, wherein the single peak is provided on an outer peripheral side of the top foil.

5. The thrust foil bearing according to claim 1, wherein a first distance between the single peak of the expansion portion and a radially inner end of the back foil in a radial direction of the insertion hole is different from a second distance between the single peak of the expansion portion and a radially outer end of the back foil in the radial direction.

6. The thrust foil bearing according to claim 5, wherein a third distance between the single peak of the expansion portion and a radially inner end of the expansion portion in the radial direction is different from a fourth distance between the single peak of the expansion portion and a radially outer end of the expansion portion in the radial direction.

7. A thrust foil bearing comprising:
   a base plate which includes an insertion hole through which a shaft is inserted;
   a back foil which is disposed around the insertion hole and supported by the base plate, the back foil being formed by adjacent mountain portions; and a top foil which is supported by the back foil,
wherein
    the top foil includes an expansion portion in which a width of the expansion portion in a contact line direction in which a contact line extends decreases in a direction orthogonal to the contact line, the contact line being a line in which one mountain portion of the mountain portions of the back foil on a most downstream side in a rotation direction of the shaft is in contact with the top foil, and
the expansion portion is provided with a through-hole.

* * * * *